United States Patent
Brun

(10) Patent No.: US 6,788,742 B1
(45) Date of Patent: Sep. 7, 2004

(54) VARIABLE LENGTH TRELLIS FOR DATA TRANSMISSION

(75) Inventor: Véronique Brun, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 621 days.

(21) Appl. No.: 09/680,397

(22) Filed: Oct. 5, 2000

(30) Foreign Application Priority Data

Oct. 13, 1999 (EP) .............................. 99402522

(51) Int. Cl.⁷ .............................. H03D 1/00; H04L 25/06
(52) U.S. Cl. .................... 375/265; 375/296; 375/341; 371/43
(58) Field of Search ................................. 375/265, 130, 375/221, 296, 341; 714/746, 758, 792, 795

(56) References Cited

U.S. PATENT DOCUMENTS 5,586,128 A * 12/1996 Chen .......................... 714/792
5,970,100 A * 10/1999 Olafsson et al. ............ 375/296
6,252,911 B1 * 6/2001 Gatherer et al. ............ 375/265
6,618,451 B1 * 9/2003 Gonikberg ................... 375/341

FOREIGN PATENT DOCUMENTS

| WO | 9508888 | 3/1995 |
|----|---------|--------|
| WO | 0030311 | 5/2000 |

OTHER PUBLICATIONS

G. David Forney, jr., "Trellis Shaping", IEEE Transactions on Information Theroy, vol. 38, No. 2, Mar. 1992.*

* cited by examiner

Primary Examiner—Stephen Chin
Assistant Examiner—Edith Chang

(57) ABSTRACT

A method of determining a current trellis describing a plurality of paths starting from an initial state, the paths having a predetermined length smaller than or equal to a maximum length, consists of storing a reference trellis comprising all the paths of the trellis of maximum length, extracting the paths of the current trellis from the reference trellis, taking into account the maximum length, the length of the current trellis, and the initial state of the paths.

5 Claims, 1 Drawing Sheet

VARIABLE LENGTH TRELLIS FOR DATA TRANSMISSION

BACKGROUND OF THE INVENTION

1. Field of the Invention

The invention relates to a method for determining a trellis describing a plurality of paths starting from an initial state and having a predefined length, said trellis being used for a transmission between a transmitter and a receiver.

The invention also relates to a modem using such a method, a communication system comprising such a modem, and a computer program comprising code means for executing the steps of said method.

The invention is useful in all cases where the paths through the trellis are short and the number of states of the trellis is small.

For example, it may be applied to V90 spectral shaping. V90 is a recommendation of the International Telecommunications Union (ITU) dealing with a digital modem and an analog modem pair for use on the public switched telephone network.

2. Description of the Related Art

It is known, from paragraph 5.4.5.5. of the V90 Recommendation, to use a trellis in a digital modem to implement a coding algorithm called "spectral shaping" algorithm. According to this recommendation, the length of the trellis is an integer lying between 0 and 3, selected by the analog modem during training procedures.

The problem is that the length of this trellis may change at each connection. Thus, at each connection, the new trellis needs be determined, which involves a lot of calculations.

SUMMARY OF THE INVENTION

One of the objects of the invention is to provide a simple method of determining the trellis for a transmission between a transmitter and a receiver.

According to the invention, all possible paths through the trellis are described branch-by-branch for the maximum length of the trellis. Then, all these paths are stored, for example, in a matrix called Reference Matrix. Paths to be used for a smaller length of the trellis are deducted from said Reference Matrix, from the length of the current trellis, from the maximum length, and from the initial state of the paths.

The invention is advantageous because it avoids the storage of all the possible configurations of paths, and thus it saves memory space.

DESCRIPTION OF THE PREFERRED EMBODIMENTS

The embodiment which will now be described relates to PCM modems in conformity with the V90 Recommendation of the ITU. This is not restrictive. The invention is applicable to any transmitter/receiver using a variable length trellis for encoding data. The only restriction for using the method of the invention is that the memory capacity has to be large enough to store the Reference Matrix. In other words, the maximum length of the trellis and the number of states of the trellis have to be small enough to allow the storage of the Reference Matrix in the available memory.

Figure 1:
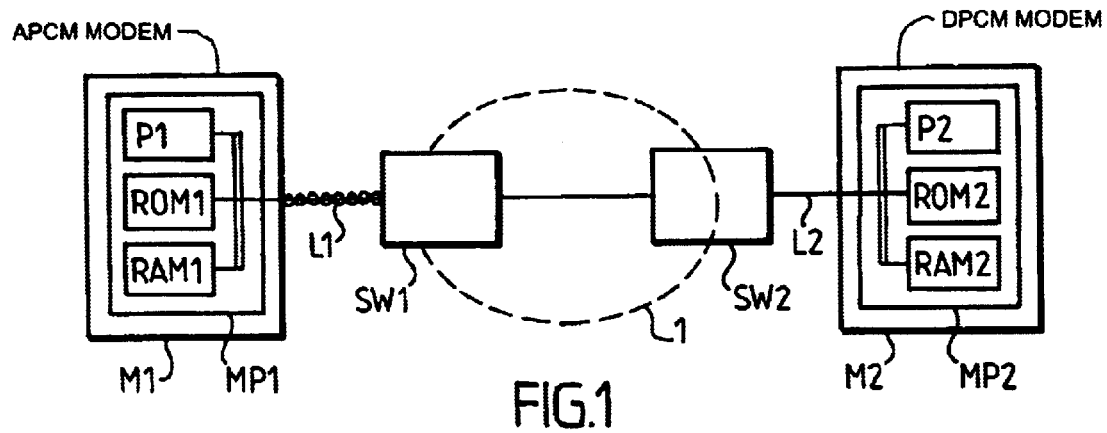
FIG. 1 is a schematic representation of an example of a communication system according to the invention.

A PCM modem enables a user U1 connected to a transmission network by an analog link and a user U2 connected to the same network by a digital link to be interconnected. They may be, for example, a user terminal U1 communicating with a data server U2 of a service provider. FIG. 1 shows an example of such a transmission system. The transmission system of FIG. 1 comprises a digital communication network 1 with two switches SW1 and SW2. An APCM modem M1 is connected to the switch SW1 via a twisted pair L1 for transmitting analog signals. A DPCM modem M2 is connected to the switch SW2 via a digital link L2, for example, an ISDN link (ISDN stands for Integrated Services Digital Network). This digital link L2 may be considered an extension of the digital transmission network, the switch SW2 then playing the role of repeater.

The APCM modem M1 and the DPCM modem M2 both comprise a microprocessor circuit MP1 and MP2, respectively. The microprocessor circuits MP1 and MP2 comprise, respectively, a read-only memories ROM1 and ROM2, random access memories RAM1 and RAM2, and processors P1 and P2.

In this example, the method of the invention is used in the DPCM modem M2 when operating as a transmitter. According to the V90 Recommendation, the digital modem uses a trellis to implement a coding algorithm called "spectral shaping" algorithm. The length of the trellis is an integer lying between 0 and 3 selected by the analog modem during training procedures. The "spectral shaping" algorithm is stored in the memory ROM2 of the DPCM modem M2.

Figure 2:
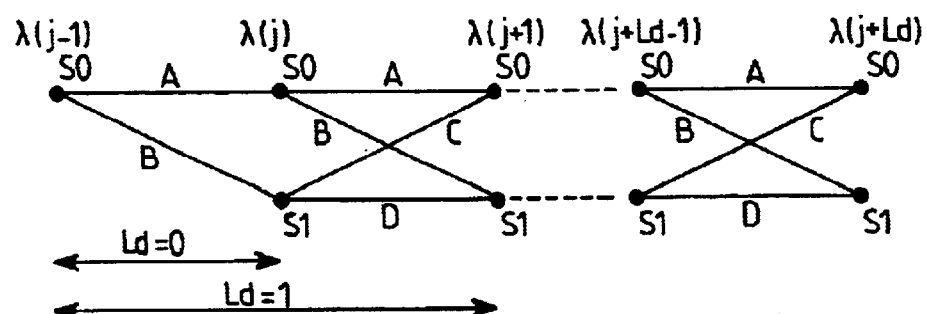
FIG. 2 is a representation of a trellis having two possible states and four possible paths.

FIG. 2 gives a representation of such a trellis. This trellis has two possible states, state S0 and state S1, and four possible paths A, B, C and D. The length of the trellis is called Ld. States $\lambda(j-1), \lambda(j), \ldots, \lambda(j+Ld)$ are the (Ld+2) successive states in the trellis. State $\lambda(j-1)$ is the initial state of the trellis. This trellis describes $2^{Ld+1}$ paths starting by initial state $\lambda(j-1)$ and comprising Ld+1 branches. FIG. 2 corresponds to the case where the initial state $\lambda(j-1)$ of the trellis is state S0.

If Ld=0, the trellis has only two state $\lambda(j-1)$ and $\lambda(j)$. Starting from initial state $\lambda(j-1)$ there are only two paths to reach $\lambda(j)$. If the initial state is S0, these two paths are branch A and branch B. Branch A is the branch between state S0 and state S0. Branch B is the branch between state S0 and state S1.

If Ld=1, the trellis has three states. Four branches exist between the second and the third state: branch A is the branch between state S0 and state S0, branch B is the branch between state S0 and state S1, branch C is the branch between state S1 and state S0, and branch D is the branch between state S1 and state S1.

When Ld>1, this four branches configuration is repeated until the end of the trellis.

This trellis diagram gives the coding rules for a frame j according to the current state $\lambda(j-1)$. The current state $\lambda(j-1)$ relates to the preceding frame j-1. In order to select the trellis branch for a frame j, the "spectral shaping" coding algorithm computes a specific metric, called "spectral metric", for all possible paths through the trellis starting from initial state $\lambda(j-1)$. Then, it selects the path that minimizes this spectral metric. The first branch of this path is the coding decision for frame j.

This means that the coding algorithm has to go through all the trellis each time a frame is to be encoded. In the following, all the paths through the trellis are stored in a matrix, so that each path corresponds to one row of the matrix.

Tables 1 and 2 below give the matrix Pref corresponding to the maximum length Ldmax of the trellis, for Ldmax=3 (which is the case in the V90 Recommendation). This matrix is called Reference Matrix. Tables 1 and 2 also give the matrix $P_{\lambda(j-1),Ld}$ to be used to go through a trellis of smaller length (Ld<Ldmax). These matrices are called Current Matrices.

TABLE 1

| Pref = | A | A | A | A | = | A | A | A | $P_{0,0}$ | = | A | A | $P_{0,1}$ | | |
|---|---|---|---|---|---|---|---|---|---|---|---|---|---|---|---|
| | A | A | A | B | | A | A | A | | | A | A | | | |
| | A | A | B | C | | A | A | B | $P_{1,0}$ | | A | A | | | |
| | A | A | B | D | | A | A | B | | | A | A | | | |
| | A | B | C | A | | A | B | C | A | | A | B | $P_{1,1}$ | | |
| | A | B | C | B | | A | B | C | B | | A | B | | | |
| | A | B | D | C | | A | B | D | C | | A | B | | | |
| | A | B | D | D | | A | B | D | D | | A | B | | | |
| | B | C | A | A | | B | C | A | A | | B | C | A | A | |
| | B | C | A | B | | B | C | A | B | | B | C | A | B | |
| | B | C | B | C | | B | C | B | C | | B | C | B | C | |
| | B | C | B | D | | B | C | B | D | | B | C | B | D | |
| | B | D | C | A | | B | D | C | A | | B | D | C | A | |
| | B | D | C | B | | B | D | C | B | | B | D | C | B | |
| | B | D | D | C | | B | D | D | C | | B | D | D | C | |
| | B | D | D | D | | B | D | D | D | | B | D | D | D | |
| | C | A | A | A | | C | A | A | A | | C | A | A | A | |
| | C | A | A | B | | C | A | A | B | | C | A | A | B | |
| | C | A | B | C | | C | A | B | C | | C | A | B | C | |
| | C | A | B | D | | C | A | B | D | | C | A | B | D | |
| | C | B | C | A | | C | B | C | A | | C | B | C | A | |
| | C | B | C | B | | C | B | C | B | | C | B | C | B | |
| | C | B | D | C | | C | B | D | C | | C | B | D | C | |
| | C | B | D | D | | C | B | D | D | | C | B | D | D | |
| | D | C | A | A | | D | C | A | A | | D | C | A | A | |
| | D | C | A | B | | D | C | A | B | | D | C | A | B | |
| | D | C | B | C | | D | C | B | C | | D | C | B | C | |
| | D | C | B | D | | D | C | B | D | | D | C | B | D | |
| | D | D | C | A | | D | D | C | A | | D | D | C | A | |
| | D | D | C | B | | D | D | C | B | | D | D | C | B | |
| | D | D | D | C | | D | D | D | C | | D | D | D | C | |
| | D | D | D | D | | D | D | D | D | | D | D | D | D | |

TABLE 2

| Pref = | A | $P_{0,2}$ | | | | = | $P_{0,3}$ | | |
|---|---|---|---|---|---|---|---|---|---|
| | A | | | | | | | | |
| | A | | | | | | | | |
| | A | | | | | | | | |
| | A | | | | | | | | |
| | A | | | | | | | | |
| | A | | | | | | | | |
| | A | | | | | | | | |
| | B | $P_{1,2}$ | | | | | | | |
| | B | | | | | | | | |
| | B | | | | | | | | |
| | B | | | | | | | | |
| | B | | | | | | | | |
| | B | | | | | | | | |
| | B | | | | | | | | |
| | B | | | | | | | | |
| | C | A | A | A | | | $P_{1,3}$ | | |
| | C | A | A | B | | | | | |
| | C | A | B | C | | | | | |
| | C | A | B | D | | | | | |
| | C | B | C | A | | | | | |
| | C | B | C | B | | | | | |
| | C | B | D | C | | | | | |
| | C | B | D | D | | | | | |
| | D | C | A | A | | | | | |
| | D | C | A | B | | | | | |
| | D | C | B | C | | | | | |
| | D | C | B | D | | | | | |
| | D | D | C | A | | | | | |
| | D | D | C | B | | | | | |
| | D | D | D | C | | | | | |
| | D | D | D | D | | | | | |

According to the invention, the Reference Matrix Pref is stored in the memory ROM2 of the DPCM modem M2, and the paths of the current trellis to be used for the "spectral metric" calculations are deducted from the Reference Matrix, from the length Ld of the trellis, and from the initial state of the path, in the following way:

$$P_{\lambda(j-1),Ld}(u,v) = P_{ref}(2^{Ld+1} \cdot \lambda(j-1) + u, Ld\max - Ld + v) \text{ where } (u,v) \in [0, 2^{Ld+1}] \times [0, Ld]$$

Figure 3:
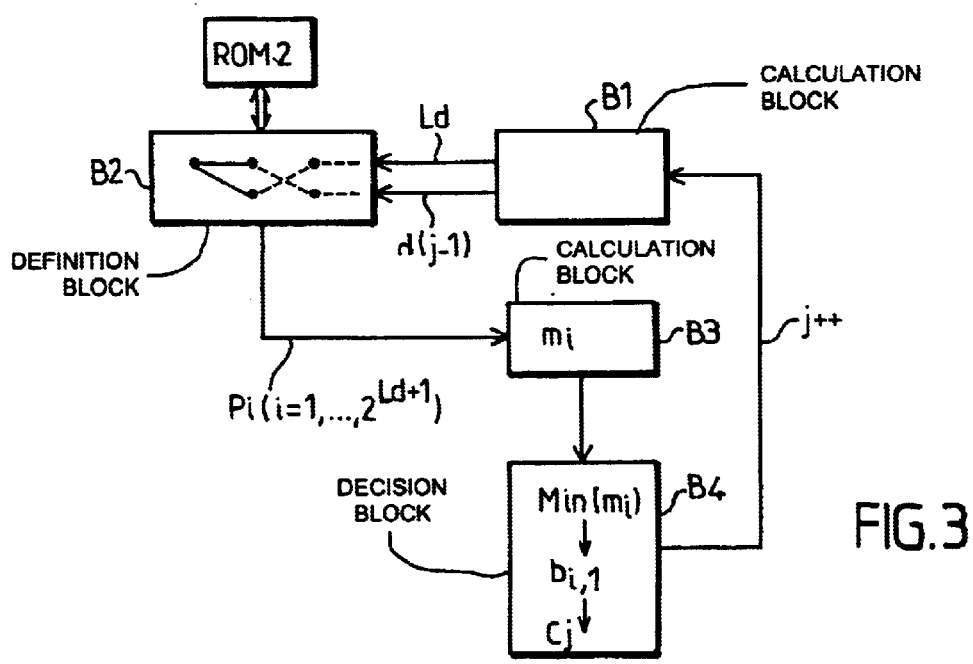
FIG. 3 is a block diagram showing the steps of a method according to the invention.

This is represented in the block diagram of FIG. 3. The current frame for which a coding decision is to be taken is called j. A "spectral metric" calculation block B1 sends two parameters to a trellis definition block B2. These two parameters are the length Ld of the current trellis and the initial state $\lambda(j-1)$. The trellis definition block B2 accesses the memory ROM2 of the modem. From the two parameters Ld and $\lambda(j-1)$, it computes the paths $P_i$ (i=1, ... $2^{Ld+1}$) to be followed in the current trellis in order to calculate the spectral metrics associated to the current frame j. These paths $P_i$ are transmitted to a metric calculation block B3. The calculated metrics $M_i$ are then transmitted to a decision block B4. This decision block B4 selects the first branch $b_i,1$ of the path, which has the minimum metric. This first branch gives the code $C_j$ which is associated to frame j. Then j is incremented, and the same process is repeated for the next frame.

The ADPCM is operating as a receiver. In the V90 Recommendation, the "de-shaping" algorithm is independent of the length of the trellis used by the DPCM transmitter. Thus, the only information to be stored in the APCM modem is a fourbranch configuration as represented in FIG. 2.

In other transmission systems, it is possible that the receiver also needs to know the complete current trellis in order to decode the received data. In this case, the Reference Matrix Pref also needs to be stored in the memory of the receiver, and the above-described method of determining the current trellis is also to be implemented in the receiver.

In the above description, only the part of the V90 Recommendation that was necessary for the understanding of the invention was described. More details on the "spectral shaping" can be found in paragraph 5.4.5 of the V90 Recommendation.

What is claimed is:

1. A method of determining a current trellis describing a plurality of paths starting from an initial state and having a predefined length smaller than or equal to a maximum length, said current trellis being used for a transmission between a transmitter and a receiver, characterized in that said method comprises the steps:

storing a reference trellis comprising all of the paths of the trellis of maximum length, said reference trellis being stored in a matrix format; and extracting the paths of said current trellis from said reference trellis taking into account said maximum length, the length of said current trellis, and the initial state of the paths, said extracting step consists of calculating elements of a matrix called trellis matrix, said elements being defined as follows:

$$P_{\lambda(j-1),Ld}(u,v) = P_{ref}(2^{Ld+1} \cdot \lambda(j-1) + u, Ld\max - Ld + v) \text{ where } (u,v) \in [0, 2^{Ld+1}] \times [0,Ld]$$

P is the current matrix, $P_{ref}$ is the reference matrix Ld, is the length of the trellis, $2^{Ld+1}$ is the number of paths in the trellis, Ldmax is the maximum length, and $\lambda(j-1)$ is the initial state.

2. A transmitter/receiver intended for using a method as claimed in claim 1.

3. A modem intended for using a method as claimed in claim 1.

4. A communication system comprising a transmitter/receiver as claimed in claim 2.

5. A computer program comprising code means for executing the steps of the method claimed in claim 1.

* * * * *